United States Patent [19]

Horowitz et al.

[11] 4,213,350
[45] Jul. 22, 1980

[54] EDGE-ACTIVE BELT

[75] Inventors: Alexandre Horowitz; Martinus H. Cuypers, both of Eindhoven, Netherlands

[73] Assignee: Varitrac AG, Zug, Switzerland

[21] Appl. No.: 906,346

[22] Filed: May 15, 1978

[30] Foreign Application Priority Data

May 18, 1977 [NL] Netherlands .......................... 7705534

[51] Int. Cl.² ................................................ F16G 5/10
[52] U.S. Cl. ..................................... 474/264; 474/244; 474/265
[58] Field of Search ............. 74/231 P, 231 M, 231 C, 74/237, 239, 234; 198/847; 156/139, 140, 141, 142

[56] References Cited

U.S. PATENT DOCUMENTS

| | | | |
|---|---|---|---|
| 2,430,024 | 11/1947 | Luaces et al. | 74/237 |
| 2,638,007 | 5/1953 | Reeves | 74/236 |
| 2,690,985 | 10/1954 | Poole | 74/237 |
| 3,682,012 | 8/1972 | Blankenship | 156/139 X |
| 3,949,621 | 4/1976 | Beusink et al. | 74/231 M |
| 4,000,240 | 12/1976 | Green et al. | 264/229 |

FOREIGN PATENT DOCUMENTS 2821698  11/1978  Fed. Rep. of Germany ............. 74/234

Primary Examiner—C. J. Husar
Assistant Examiner—Conrad Berman
Attorney, Agent, or Firm—Haseltine, Lake & Waters

[57] ABSTRACT

A pull strand of high tensile strength which may be composed of a number of parallel, longitudinal steel wires and a series of transverse, stiffener elements made of aluminum or other metal spaced along the pull strand and providing oppositely facing lateral edges for active engagement with coned sheaves are interconnected solely by a continuous molded body of rubber or rubberoid material in adherence with the pull strand and with the transverse elements. The molded body runs longitudinally through identical cavities of the said transverse elements, extending sidewardly at least onto their lateral edges and filling intermediately thereto at least a portion of each space between the sidewalls of the said transverse elements along the said cavities.

8 Claims, 3 Drawing Figures

EDGE-ACTIVE BELT

FIELD OF THE INVENTION

This invention relates to power transmission belts of the type intended to cooperate with coned sheaves and comprising a strand of material of high tensile strength, such as a steel wire strand, combined with transverse elements longitudinally spaced along the length of the strand.

These transverse elements have lateral edges which provide oppositely facing surfaces for active engagement with the coned sheaves and act at the same time as transverse stiffener members for the belt strand.

PRIOR ART

An example of the abovementioned belt type is disclosed in U.S. Pat. No. 2,638,007 (Reeves). According to this known art, transverse elements are frictionally clamped to a continuous molded body of rubber or rubberoid material of uniform cross-section by means of a continuous metal clamp strip. The ends of the cross section of the strip overhang the lateral edges of the strand. Bolts are passed through each of these ends and are screwed into each of the transverse elements to clamp the same against the said continuous belt body. The assembly formed by the strand, rubber body and clamp strip is embedded in and runs longitudinally through identical cavities of the transverse elements.

The means as described for securing the transverse elements to the strands gives rise to obvious complications, both in the manufacture and in the use of such belts, because of the use of an additional metal clamping strip and the bolts necessary to obtain the desired clamping result.

As a consequence, there is a risk of loosening of screw bolts during long continued use of the belt.

An example of a method for molding an endless belt having oppositely inclined facing lateral edges is disclosed in U.S. Pat. No. 4,000,240 (Green et al).

SUMMARY OF THE INVENTION

This invention is directed primarily to an improved belt construction and particularly to a simplification and improvement of the means for connecting the transverse elements to the belt strand.

In this respect, it is one object of the invention to shape a belt comprising the aforementioned strand and transverse elements but having a shape and composition which enables molding it as one integral body by which any subsequent mounting of parts is made superfluous.

It is a further object of the invention to shape and arrange the parts of the integral body in a way so as to make sure that the transverse elements are engaged by the rubber or rubberoid material of the continuous molded body along a sufficient large portion of their surfaces to ensure a safe attachment of these elements in the molded body over a very long range of use.

It is still another object of the invention to split up the pull strand into two longitudinal sections in one plane each molded by the intermediary of one said continuous, flexible body inside one of two series of identical inwardly extending opposite sideward slots of the transverse elements, thereby providing large engaging surfaces on the upper and lower side of each slot.

Other features of the invention and further objects and advantages thereof will become apparent from the following detailed description of a specific embodiment thereof, as shown in the drawings.

BRIEF DESCRIPTION OF THE DRAWINGS

In the following description of an embodiment of the present invention reference is made to the accompanying drawing, in which.

DETAILED DESCRIPTION

Figure 1:
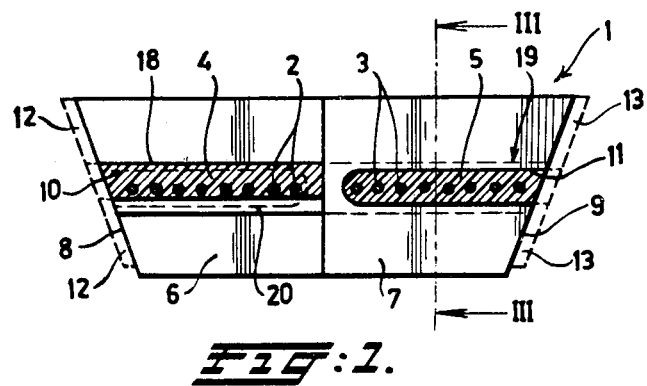
FIG. 1 represents two cross sections of a belt constructed according to the present invention, at the left hand side taken along line $I_1$—$I_1$ in FIG. 2 and at the right hand side along the line $I_2$—$I_2$ in FIG. 3.

In the figures the belt as a whole is designated by numeral 1. The belt comprises a strand of high tensile strength, composed of two sets of cords 2, 3 arranged in a common plane. These strands are intended to resist the pull forces and each cord may be made of twined steel wire or other material of high tensile strength, such as synthetic wire with high resistance to stretch. The cords 2, 3 are each embedded in a molded body 4, 5 of rubber or rubberoid material. This body 4, 5 continues together with the strands 2, 3 flexibly along the entire length of the belt. The term "rubberoid" includes synthetic material, for example, of a polyurethane composition.

According to the present invention, the material of the bodies 4, 5 adheres not only to the surface of the cords 2, 3 but also to the engaging surfaces of a series of transverse, identical stiffening members such as designated by 6 and 7 which are spaced longitudinally along the entire length of the belt 1 preferably at a distance from each other which is slightly less than their thickness.

The member 6, 7 have oppositely facing end surfaces 8, 9 angularly disposed relative to a cross-sectional plane of the belt so that the transverse members 6, 7 have substantially the overall shape of an isosoeles trapezoid. The end surfaces 8, 9 provide for active engagement with coned sheaves for the application of the belt 1 as a power transmitter in infinitely variable wedge belt drives, while at the same time forming transverse stiffening members for the assembly of the belt strand 2, 3 and the flexible bodies 4, 5 to absorb the compressive stress which would otherwise be placed directly on the assembly by the coned sheaves.

The transverse members, such as 6, 7, are preferably made of metal and aluminum alloy has been found to be suitable and has the advantage that a light weight belt is obtained as well as a good adherence between the flexible bodies 4, 5 and the metal components of the belt 1.

In the preferred embodiment, as shown each of the flexible continuous bodies 4, 5, is molded inside one of two series of identical, inwardly extending, oppositely sideward slots 10, 11 provided in each of the said stiffener elements 6, 7.

In this way, large engaging surfaces between the elastic bodies 4, 5 and the upper and lower surfaces of the said slots 10, 11 are shaped. Moreover, these engaging surfaces are larger than those as obtained in the aforementioned U.S. Pat. No. 2,638,007 (Reeves), because the bodies 4, 5 extend sidewardly between the transverse elements 6, 7 at least to their oppositely facing end surfaces 8, 9. When molding the bodies 4, 5 integrally with the metal parts 2, 6, 7 in a die, space can be provided therein on both sides of the opposite faces 8, 9 of the elements 6, 7 so that the mass of the flexible bodies 4, 5 is sidewardly continued outside of the surface 8, 9 form friction pads on said surfaces as designated by dotted lines 12, 13 in FIG. 1.

Thus, the friction pads 12, 13 will form one integral unit with the bodies 4, 5 which has the advantage of increased strength and simple manufacture.

A good adherence between the material of the rubber or rubberoid type and the metal parts engaged therein is obtained, according to the known art upon vulcanizing the material in a mold and this is true for synthetic material during the phase of its curing.

It can also be seen in the drawings, that for obtaining a still larger engaging surface with the stiffener members 6, 7 and for securing the spacing of these members the material of the elastic bodies enters above and below the strands 2 and 3 into the spaces such as 14–17, between the elements 6, 7 as seen at 18, 20 and 19, 21, adhering to at least a portion of the side walls of the elements 6, 7 along and beyond the edges of the cavities 10, 11.

Figure 2:
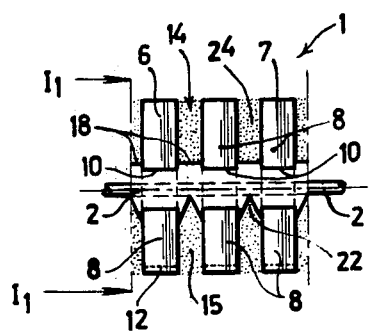
FIG. 2 is a fragmental side view of the belt.
Figure 3:
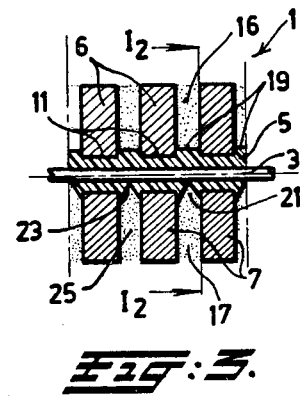
FIG. 3 is a fragmental cross-section taken along line III—III in FIG. 1.

However, as indicated at 21 and 22 in FIGS. 2 and 3, respectively, the flexible molded bodies 4 and 5 are respectively indented substantially to the surface of the pull strands 2, 3 in the middle plane between the adjoining parallel faces of each of two of the stiffener elements 6, 7.

This indentation is due to the fact that within the mold the strands 2, 3 are supported in a circular form upon radial extensions of a central mandrel extending between the stiffener elements which are positioned in the mold.

In an advantageous embodiment of the invention, as shown in FIGS. 2 and 3, and as designated at 24 and 25, the spaces, such as 14–17 between the stiffener elements 6, 7 above and below the flexible molded bodies 4, 5 are filled with a material which is more easily compressible than that of the molded material. For this purpose, a spongy material of the plastic-foam-type can be used.

This construction prevents, during use of the belt, the open spaces between the elements 6, 7 from becoming filled gradually with dirt or other particles whereby the flexibility of the belt would decrease as would the coefficient of friction as desired for the power transmission. In both cases, this would decrease the efficiency of the transmission.

In an example of practical application of an endless belt having a diameter of 400 mm. in a cylindrical position, the thickness of the stiffener elements can be about 3 mm. at a spacing of about 2 mm.

The stiffener members may be made of a special copper-aluminum alloy having high resistance.

The cavities 4, 5 are preferably positioned in such a way that the plane of the strands 2, 3 located at the resulant of the circumferential forces on the outer faces 8, 9 of the stiffener elements in order to avoid undesirable moments and sideward forces on the belt. Thereby, the amount of material in the flexible molded bodies 4, 5 can be reduced to a minimum and ensure the connection with the strands 2, 3 and with the stiffener elements 6, 7.

What is claimed is:

1. A belt comprising a longitudinal pull strand of high tensile strength and a series of transversely extending longitudinally spaced stiffener elements having oppositely facing end-surfaces angularly disposed with respect to a cross-sectional plane of said belt, said pull strand being enclosed in a continuous flexible molded body of rubber type material extending longitudinally through identical cavities provided in said transverse element and in which each transverse element is connected to the said body, said flexible continuous body being molded integrally with and adhering to said pull strand as well as being integral with and adhering to said transverse elements as the sole interconnecting means between the said elements sidewardly at least onto their said oppositely-facing end surfaces and further adhering to at least a portion of the side walls of the said elements along and beyond the edges of said cavities in each space between said elements.

2. A belt as claimed in claim 1, wherein said pull strand is divided into two longitudinal sections in one plane each molded by the intermediary of one said continuous flexible body inside one of two series of identical inwardly extending, opposite, sideward slots provided in each of said stiffener elements, thus forming engaging surfaces on the upper and lower side of each slot.

3. A belt as claimed in claim 1, wherein said stiffener elements are spaced from each other at distances which are less than the thickness of the said elements.

4. A belt as claimed in claim 1, wherein the mass of said continuous flexible, molded body is sidewardly continued outside of said oppositely facing surfaces of the said stiffener elements in the shape of friction pads on said surfaces.

5. A belt as claimed in claim 1, wherein the spaces between said stiffener elements above and below said continuous, flexible molded body are filled with a material which is more elastically compressible than that of the said molded body.

6. A belt as claimed in claim 5, wherein said spaces are filled with a spongy material of spongy plastic-foam-type.

7. A belt as claimed in claim 1, wherein the mass of said continuous, flexible molded body is indented substantially to surface of the said pull strand in a middle plane between the adjoining parallel faces of each of two of said stiffener elements.

8. A belt as claimed in claim 1, wherein said transverse stiffening members are made of aluminum alloy.

* * * * *